US008438478B2

(12) United States Patent
Takami et al.

(10) Patent No.: US 8,438,478 B2
(45) Date of Patent: May 7, 2013

(54) DISPLAYING AN OVERLAPPED PRINT PREVIEW FOR MULTIPLE PAGES WITH DIFFERENT FINISHING OPTIONS

(75) Inventors: Junichi Takami, Kanagawa (JP); Tetsuya Sakayori, Toyko (JP); Takashi Yano, Tokyo (JP); Iwao Saeki, Kanagawa (JP); Yoshinaga Kato, Kanagawa (JP); Haruo Shida, Kanagawa (JP); Yoshifumi Sakuramata, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1217 days.

(21) Appl. No.: 11/640,060

(22) Filed: Dec. 14, 2006

(65) Prior Publication Data
US 2007/0139707 A1 Jun. 21, 2007

(30) Foreign Application Priority Data

Dec. 15, 2005 (JP) .................................. 2005-362187
Oct. 2, 2006 (JP) .................................. 2006-270785

(51) Int. Cl.
*G06N 3/00* (2006.01)
(52) U.S. Cl.
USPC ........................................................ 715/274
(58) Field of Classification Search ........... 715/273–277
See application file for complete search history.

(56) References Cited

U.S. PATENT DOCUMENTS

| 6,101,283 | A * | 8/2000 | Knox ............................. 382/254 |
| 6,262,732 | B1 * | 7/2001 | Coleman et al. .............. 715/835 |
| 6,927,865 | B1 * | 8/2005 | Kujirai et al. ................. 358/1.12 |
| 7,072,070 | B2 * | 7/2006 | Masaki ......................... 358/1.18 |
| 7,483,166 | B2 | 1/2009 | Kadoi et al. |
| 7,609,401 | B2 | 10/2009 | Kujirai et al. |
| 2002/0090119 | A1 * | 7/2002 | Saito et al. ..................... 382/128 |
| 2003/0159114 | A1 * | 8/2003 | Nishikawa et al. ........... 715/530 |
| 2004/0181754 | A1 * | 9/2004 | Kremer et al. ................. 715/526 |
| 2004/0207859 | A1 * | 10/2004 | Kadoi et al. ................... 358/1.1 |
| 2005/0149863 | A1 * | 7/2005 | Kato et al. .................... 715/527 |
| 2007/0143671 | A1 * | 6/2007 | Paterson et al. ............... 715/527 |
| 2010/0064211 | A1 | 3/2010 | Kujirai et al. |

FOREIGN PATENT DOCUMENTS

| JP | 11-234503 | 8/1999 |
| JP | 2001-67347 | 3/2001 |
| JP | 2002-103726 | 4/2002 |
| JP | 2003-5471 | 1/2003 |
| JP | 2004-318581 | 11/2004 |

OTHER PUBLICATIONS

Apr. 19, 2011 Japanese official action in connection with a counterpart Japanese patent application.

* cited by examiner

*Primary Examiner* — Kyle Stork
(74) *Attorney, Agent, or Firm* — Cooper & Dunham LLP

(57) ABSTRACT

An analyzing unit analyzes components of input information. An area generating unit generates information on an area-representing image. A preview generating unit generates information on a preview in which the area-representing images are overlapped for each page. An operation display unit displays the information on the preview and information on a function to be performed, and accepts an instruction for setting the function. Upon accepting the instruction for the function, the preview generating unit further generates information on a preview with a processing according to the instruction performed.

20 Claims, 13 Drawing Sheets

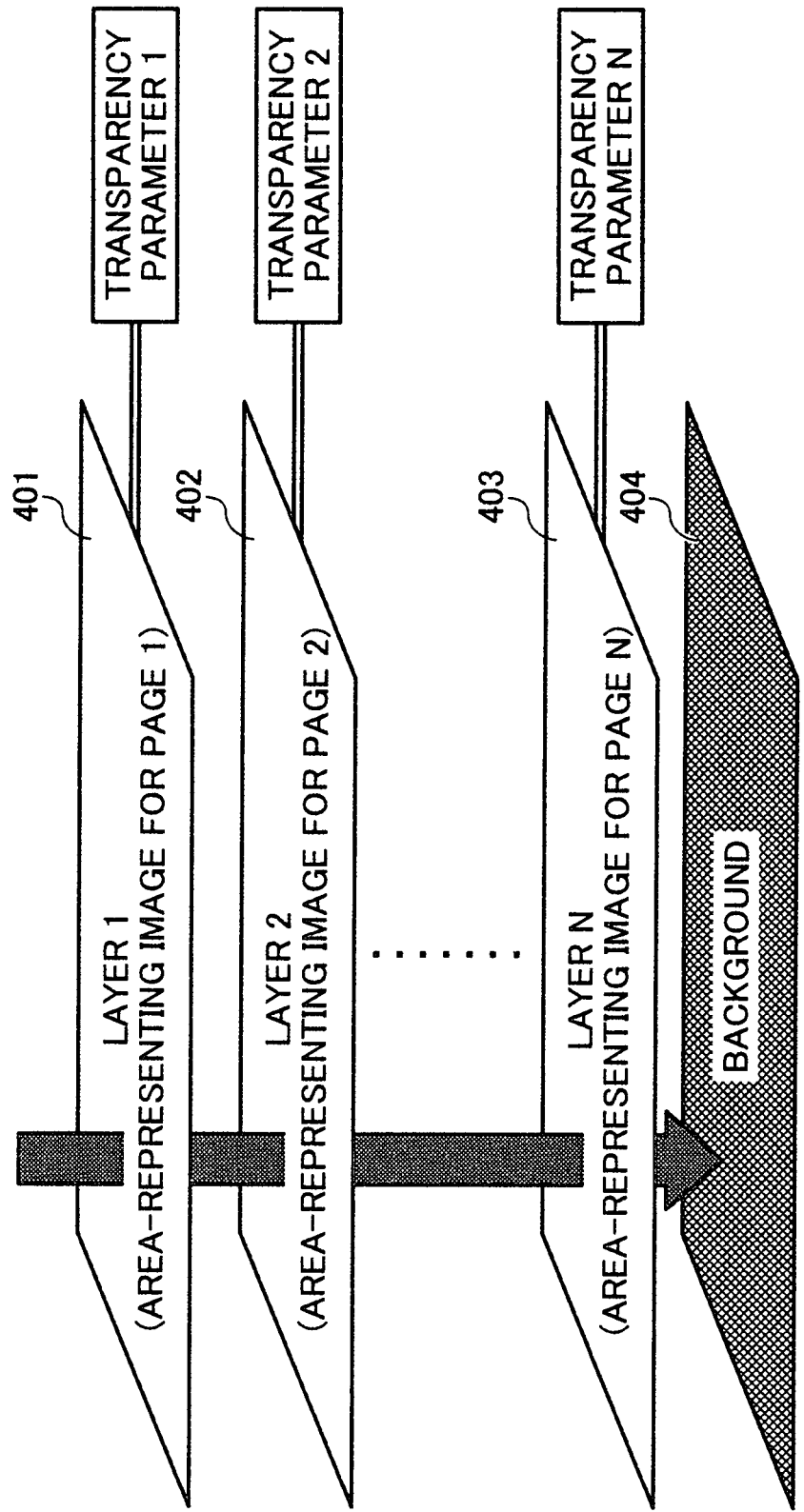

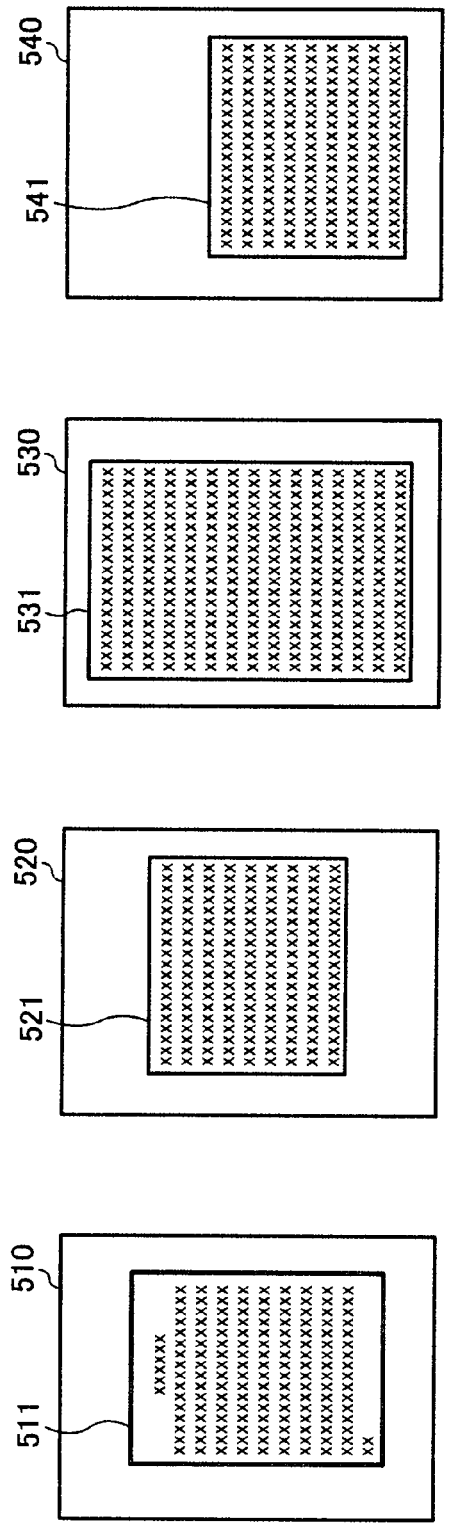
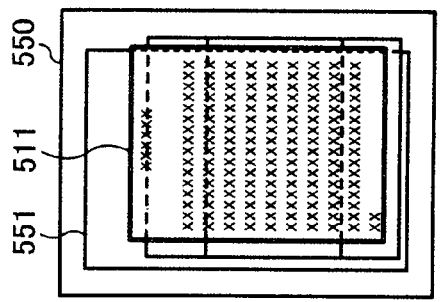
FIG. 5

DISPLAYING AN OVERLAPPED PRINT PREVIEW FOR MULTIPLE PAGES WITH DIFFERENT FINISHING OPTIONS

CROSS-REFERENCE TO RELATED APPLICATIONS

The present document incorporates by reference the entire contents of Japanese priority documents, 2005-362187 filed in Japan on Dec. 15, 2005 and 2006-270785 filed in Japan on Oct. 2, 2006.

BACKGROUND

1. Technical Field

This disclosure relates to a user interface device, an image displaying method, and a computer program product.

2. Description of the Related Art

Conventional image processors such as copying devices, facsimile devices, and printers require users to select a function to be performed to set the contents of the function. For example, it is necessary to perform a setting of a state of a document such as paper type and density, a setting of an image processing such as zoom in and zoom out of an image, a single-sided/double-sided printing, and a margin setting, and a setting of a post-processing such as sorting, stapling, and punching.

Therefore, the conventional image processors prepare a plurality of functions for the settings, and the users are required to perform various settings to obtain a desired processing result.

However, the users cannot figure out the final processing results, for example, the printed results, until the document is actually printed out, and in some cases, the results may be undesirable.

To solve the above problem, a preview displaying device has been proposed, which displays a preview image indicating the printed result (see, for example, Japanese Patent Application Laid-Open No. 2003-5471). In addition, an image processing apparatus has been proposed, which displays, when an image data according to various paper types is selected, a preview of the image printed on the paper of the selected paper type (see, for example, Japanese Patent Application Laid-Open No. 2002-103726). Furthermore, an image forming system has been proposed, which displays a preview by synthesizing a plurality of edited image data (see, for example, Japanese Patent Application Laid-Open No. H11-234503 discloses).

The conventional technologies display the processed images of the processing results according to the settings, one by one, or by synthesizing the images. By performing the setting operations through the preview images such as modifying the setting, the setting can be performed after the result is confirmed, so that the desired image output can be acquired.

However, the conventional technologies merely display the processed images for the processing result, one by one, or by synthesizing the images. Therefore, when there are a number of images, the users can hardly confirm the images at once because the users have to turn pages one by one to identify holistic configurations of all the images and to find specific images.

BRIEF SUMMARY

A user interface device according to an aspect of this disclosure is for displaying input information including page-by-page information and accepting a setting of a function. The user interface device includes an analyzing unit that analyzes components of the input information; an area generating unit that generates information on an area-representing image that represents defining of an area occupied by meaningful information in each page of the input information, based on a result of analysis by the analyzing unit; a preview generating unit that generates information on a preview in which the area-representing images are overlapped for each page, based on the information on the area-representing image data generated by the area generating unit; and an operation display unit that displays the information on the preview generated by the preview generating unit, displays information on a function to be performed on the input information, and accepts an instruction for setting the function from a display of the information on the function. When the operation display unit accepts the instruction, the preview generating unit further generates information on a preview after performing a processing according to the instruction.

A method according to another aspect of this disclosure is for displaying an image for a user interface device that displays input information including page-by-page information and accepts a setting of a function. The method includes analyzing components of the input information; generating information on an area-representing image that represents defining of an area occupied by meaningful information in each-page of the input information, based on a result of analysis; generating information on a preview in which the area-representing images are overlapped for each page, based on generated information on the area-representing image; and displaying including displaying generated information on the preview, displaying information on a function to be performed on the input information, and accepting an instruction for setting the function from a display of the information on the function. When the instruction is accepted, the generating information on the preview includes generating information on a preview after performing a processing according to the instruction.

A computer program product according to still another aspect of this disclosure includes a computer usable medium having computer readable program codes embodied in the medium that when executed cause a computer to execute analyzing components of the input information; generating information on an area-representing image that represents defining of an area occupied by meaningful information in each page of the input information, based on a result of analysis; generating information on a preview in which the area-representing images are overlapped for each page, based on generated information on the area-representing image; and displaying including displaying generated information on the preview, displaying information on a function to be performed on the input information, and accepting an instruction for setting the function from a display of the information on the function. When the instruction is accepted, the generating information on the preview includes generating information on a preview after performing a processing according to the instruction.

The aforementioned and other aspects, features, advantages and technical and industrial significance will be better understood by reading the following detailed description of presently preferred embodiments of the invention, when considered in connection with the accompanying drawings.

BRIEF DESCRIPTION OF THE DRAWINGS

FIG. 4 is a schematic for explaining a configuration of a buffer for displaying a preview;

FIG. 5 is a schematic for explaining an example of a display of an area-representing image of a scanned document and an overlapping display of the area-representing images;

DETAILED DESCRIPTION OF THE PREFERRED EMBODIMENTS

Exemplary embodiments of a user interface device, an image forming apparatus, an image displaying method, and a computer program product according to the present invention are described below in detail with reference to the accompanying drawings.

A user interface device according to a first embodiment of the present invention analyzes input data that includes page-by-page data, generates an area-representing image that indicates defining of an area for the data that occupies each page when the input data is output, displays a preview by overlapping the area-representing images for each page, displays the processing functions to be performed to the input data on an operation display unit, and accepts specified processing through the displayed functions. Then, the user interface device according to the first embodiment displays the preview image on the operation display unit, on which the specified processing is performed.

The input data is analyzed into image types, the area-representing image is defined according to the image types, and the images are displayed according to the defined image types, so that the user can simply confirm the layout for all the pages.

Figure 1:
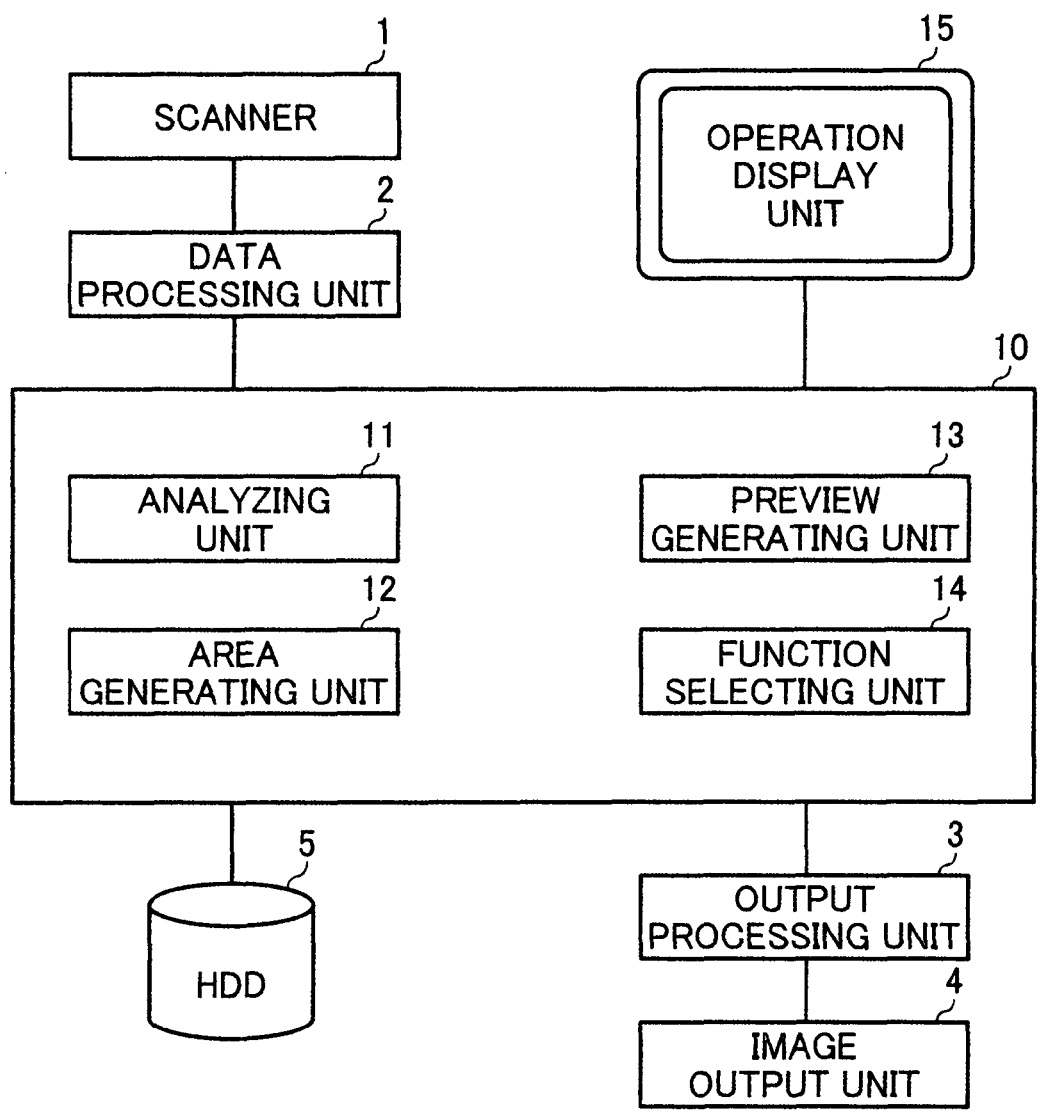
FIG. 1 is a functional block diagram of an image forming apparatus including a user interface device according to a first embodiment of the present invention.

FIG. 1 is a functional block diagram of an image forming apparatus including a user interface device 10 according to the first embodiment. The image forming apparatus includes a scanner 1, a data processing unit 2, an output processing unit 3, an image output unit 4, a hard disk drive (HDD) 5, and the user interface device 10.

The scanner 1 reads a document. The scanner 1 reads the document by emitting light to the document relatively moving in a sub-scanning direction, and converting the light reflection into electric signals through transducers such as a charge coupled device (CCD). When the scanner 1 includes an auto document feeder (ADF) or the like, which feeds documents page-by-page, the scanner 1 sequentially reads each page, and sends the analog data to the data processing unit 2.

The data processing unit 2 receives the analog data read by the scanner 1, converts the analog data into digital data, and outputs the data to the HDD 5, while sending the data to the user interface device 10.

The HDD 5 includes a high-capacity random access memory (RAM) and an HDD, and sorts the data read by the scanner 1 into files and stores the data.

The user interface device 10 inputs and displays the image data, accepts setting of various functions, and displays the image to which processing is performed according to the accepted setting.

The output processing unit 3, based on the setting accepted by the user interface device 10, performs the processing for the output to the input image data. The output processing unit 3 performs required various processing including a gamma correction to the input image data. The image output unit 4 outputs the image according to the processing for the output performed by the output processing unit 3. The processing for the output includes post-processing performed after printing such as stapling and punching, added to the image output to papers, through image forming.

The user interface device 10 includes an analyzing unit 11, an area generating unit 12, a preview generating unit 13, a function selecting unit 14, and the operation display unit.

The analyzing unit 11 analyzes the input data into document components. The analyzing unit 11, to the document file stored in the HDD 5 or the image data received from the data processing unit 2, calculates characteristic values of the documents, analyzes the result of calculation or the characteristic values of the documents, and outputs the analyzed values to the preview generating unit 13.

The characteristic values analyzed by the analyzing unit 11 are the value for state of the documents, the value for the images, and values for layouts, briefly. The values for the state of the documents include digitalized information for a number of pages of the documents, the double-sided or single-sided determination, and the like. The values for the images include the digitalized information for image types (a text, a photo, a drawing, and an image in which the above are mixed), colors (monochrome/color determination and a number of colors), a density, a pixel density (area proportion of pixels for image presence to the entire document), a character size, and the like. The values for the layout include digitalized information for a page direction (a positioning between each page of the document pages, relatively to horizontal and vertical directions), a document size, a margin width, a layout data (column setting determination for the document), and the like.

The analyzing unit 11 analyzes the input image data into the image types including the text, the photo, the drawing, and others. Also, the analyzing unit 11, based on the analysis, divides the image data. For example, the text is divided into paragraph. The analyzing unit 11 can utilize an optical character recognition, and the like. The analyzing unit 11 divides the photo or the drawing for each of the photo images and each of the drawing images.

The analyzing unit 11, for example, performs the divining of the text area by determining an area in which a portion determined as a character is continuously presiding. The analyzing unit 11 also performs the divining of the photo image area by detecting a continuation of halftones, and detecting the area to be the photo area. The analyzing unit 11 detects the drawing by detecting an edge, a gradation, and the like. The unit determines that the other areas are not the text, the photo, or the drawing, and divines into the areas. The above technologies are the conventional technologies, and thus, detailed descriptions are omitted.

The analyzing unit 11 can be configured for zoning of the identifiable area for the information included in an entire page by analyzing histograms of the main scanning direction and the sub-scanning direction to the page for the input data.

The area generating unit 12, based on the result of the analysis by the analyzing unit 11, generates the area-representing image indicating the defining of the area of the information included in the page, for each page when the input data is output. For example, the preview generating unit 13 defines the area of the image in the page and generates the area-representing image including the defined area, through the divining by the analyzing unit 11.

The area-representing image is a display indicating an area, in which the identifiable image, as information, occupies, such as a paragraph for the text, a photo for the photo, and an illustration for the illustration.

The area-representing image, for example, is a two-dimensional chart that covers the defined area, and the defined area can be indicated by a borderline surrounding the defined area. Or, the area-representing image can be displayed by a rectangular area including all the characters, for the pages comprised of the characters.

The area generating unit 12 can display by, when the analyzing unit 11 is simply for performing the analysis for the histogram of the main scanning direction and the sub-scanning direction, one or more rectangular area per each page, according to the histogram distribution.

The area-representing image can be displayed along with a frame for an entire area for a page is displayed. Also, the area-representing image can be displayed including that each area is zoned and hemmed by a borderline for each image type such as the text or the photo, in the page. The area generating unit 12 maybe configured for a more detailed display such as thumbnails of the text, photo, and the like, for the zoned areas within one page. The area generating unit 12 can cause an operation display unit 15 to display the image by generating image data that is displayed as an area-representing image or an area-representing image including the defined area.

The preview generating unit 13, according to the area-representing image data generated by the area generating unit 12, generates a preview data for the display of the input data by the operation display unit 15.

The preview generating unit 13, for the image of a first scan, generates the image to which a default setting processing is performed. For example, when the setting is for the stapling processing on the upper-left of each page, the setting is the default setting, and is to be displayed accordingly.

Here, the preview generating unit 13, based on the area-representing image data, generates the input data into a preview image in which the pages and the included area-representing images are overlapped, to be displayed by the operation display unit 15.

The function selecting unit 14, according to the result of the analysis by the analyzing unit 11 and the preview data generated by the preview generating unit 13, selects the functions that can be processed for the input data. The function selecting unit 14 can select and pre-set the settings for positions for stapling, punching, margin adjustment, and page numbers, and the like, through default selection of the settings.

The function selecting unit 14, for example, when the input data is analyzed as a monochrome data, omits the functions such as an output color. Also, when the document scanned by the scanner 1 is a thick book and the like, and an image of a black frame occurs at edges of each page, the setting for an "edge erase" is selected, when the analyzing unit 11 analyzes a presence of the black frame. Thus, the function selecting unit 14, based on the result of the analysis by the analyzing unit 11, selects required functions and omits the functions not required.

The function selecting unit 14 can not be included in the configuration. A set of pre-set functions are to be always set in the configuration above.

The operation display unit 15 displays the preview including the overlapping area-representing image data for each page based on the preview data by the preview generating unit 13. The operation display unit 15 displays the function selected by the function selecting unit 14 to accept an instruction from a display of specifications for the selected function item. For inputting the instruction, a touch-input operation by the user is acceptable.

When the operation display unit 15 receives the instruction, the preview generating unit 13 generates data for the preview display after execution of processing according to the specification. The operation display unit 15 displays a preview according to the generated data for the preview display.

The operation display unit 15, for example, utilizes a liquid crystal display and the like, and can include a touch panel, installed at an upper portion of the display within the configuration. The operation display unit 15 includes various buttons and the touch panel installed on the screen for the displaying the preview. Through the buttons and the touch panel, various operations required for operating the user interface device 10, and, more specifically, various setting operations such as image-processing of the images included in the documents which the users desire to print, the setting of the printing, and the setting for the post-processing, are accepted.

The various settings performed by the operation display unit 15, for the printing are, for example, the setting of various functions for the scanning conditions for the scanner 1, the setting of various functions for the image processing that processes the scanned image data (sharpness, color adjustment, and the like) for the image processing unit which is not illustrated, the setting of various functions for the printing conditions for the printing unit (not shown), and the setting of various functions for the post-processing such as sorting, stapling, and punching for the post-processing unit (not shown).

Figure 2:
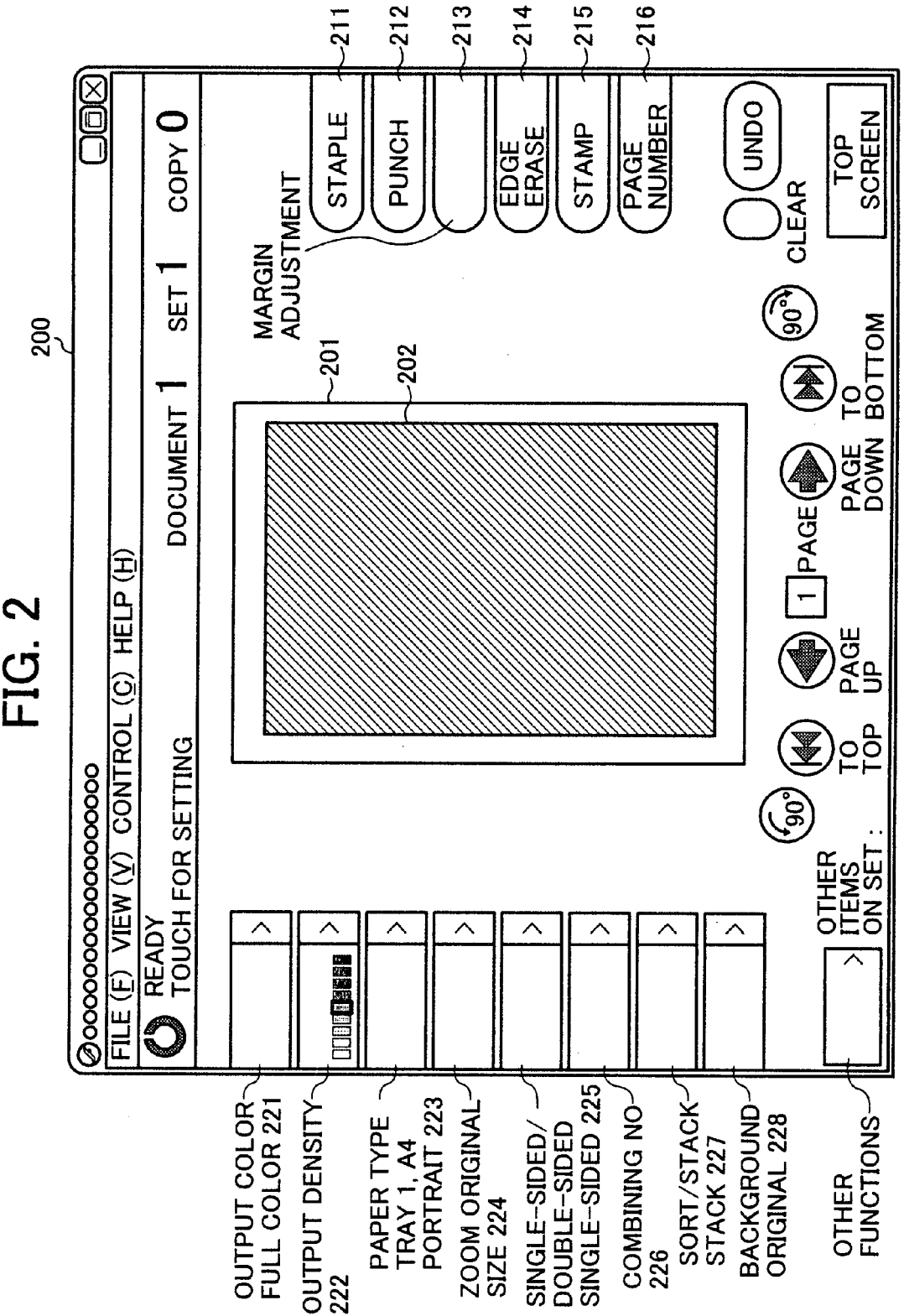
FIG. 2 is a schematic for explaining an example a display of an area-representing image and functions by an operation display unit.

FIG. 2 is a schematic for explaining an example a display of an area-representing image and functions by the operation display unit 15. On a screen 200, an image 201 according to the scanned image data is displayed. The image 201 is a display for the entire document, in which the area including identifiable data generated from the scanned data and the frame for the area are displayed. Here, the frame and an interior of the frame is an area-representing image 202.

Figure 3A:
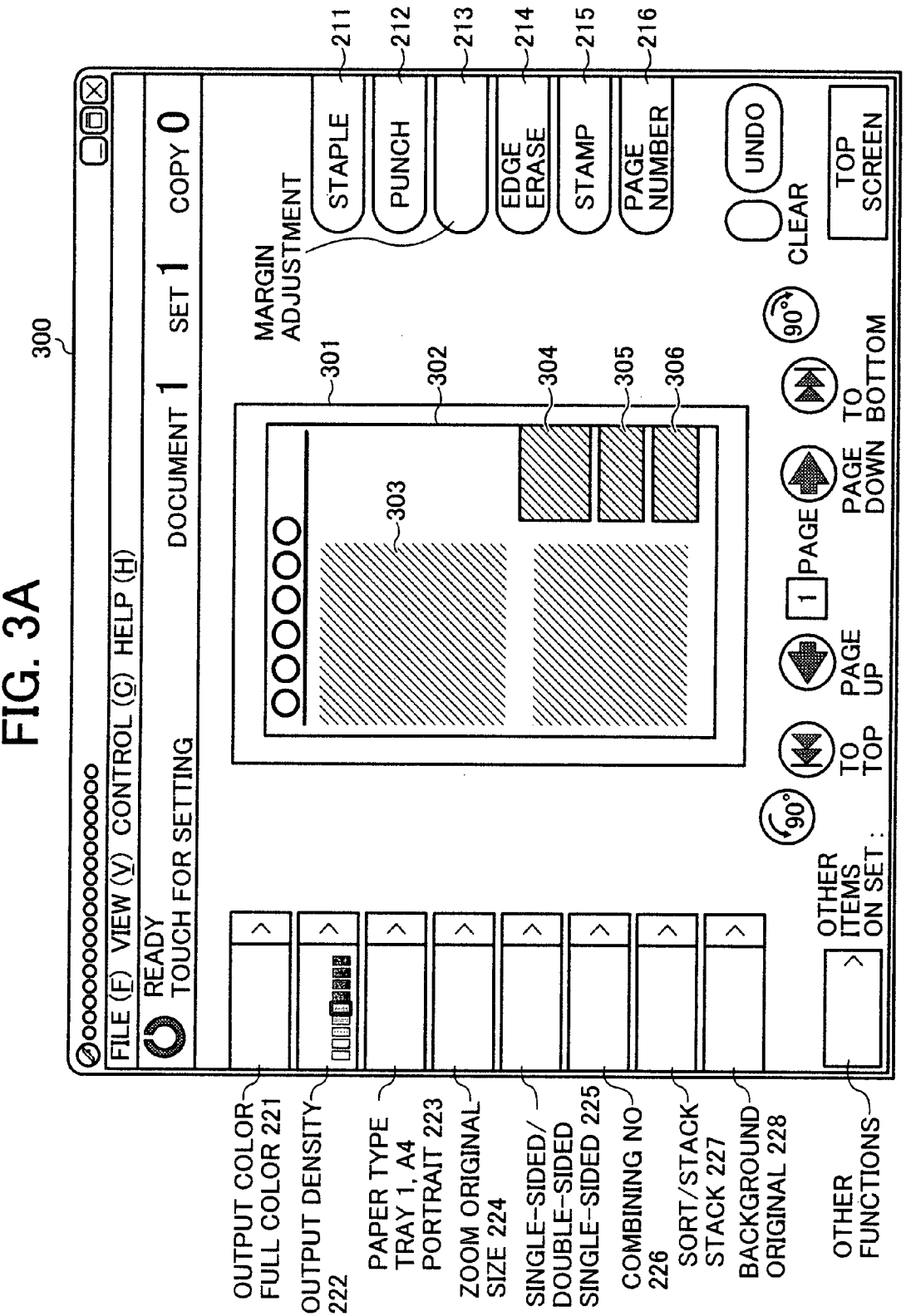
FIGS. 3A and 3B are schematics for explaining another example of a display of the area-representing image and the functions by the operation display unit.

FIG. 3A is a schematic for explaining another example of a display of the area-representing image and the functions by the operation display unit 15. In the image for an entire document 301, a frame that indicates a border of an area-representing image 302 is displayed, and a text area 303, photo areas 304-306 are displayed, including that the positions of each area are distinguished.

Figure 3B:
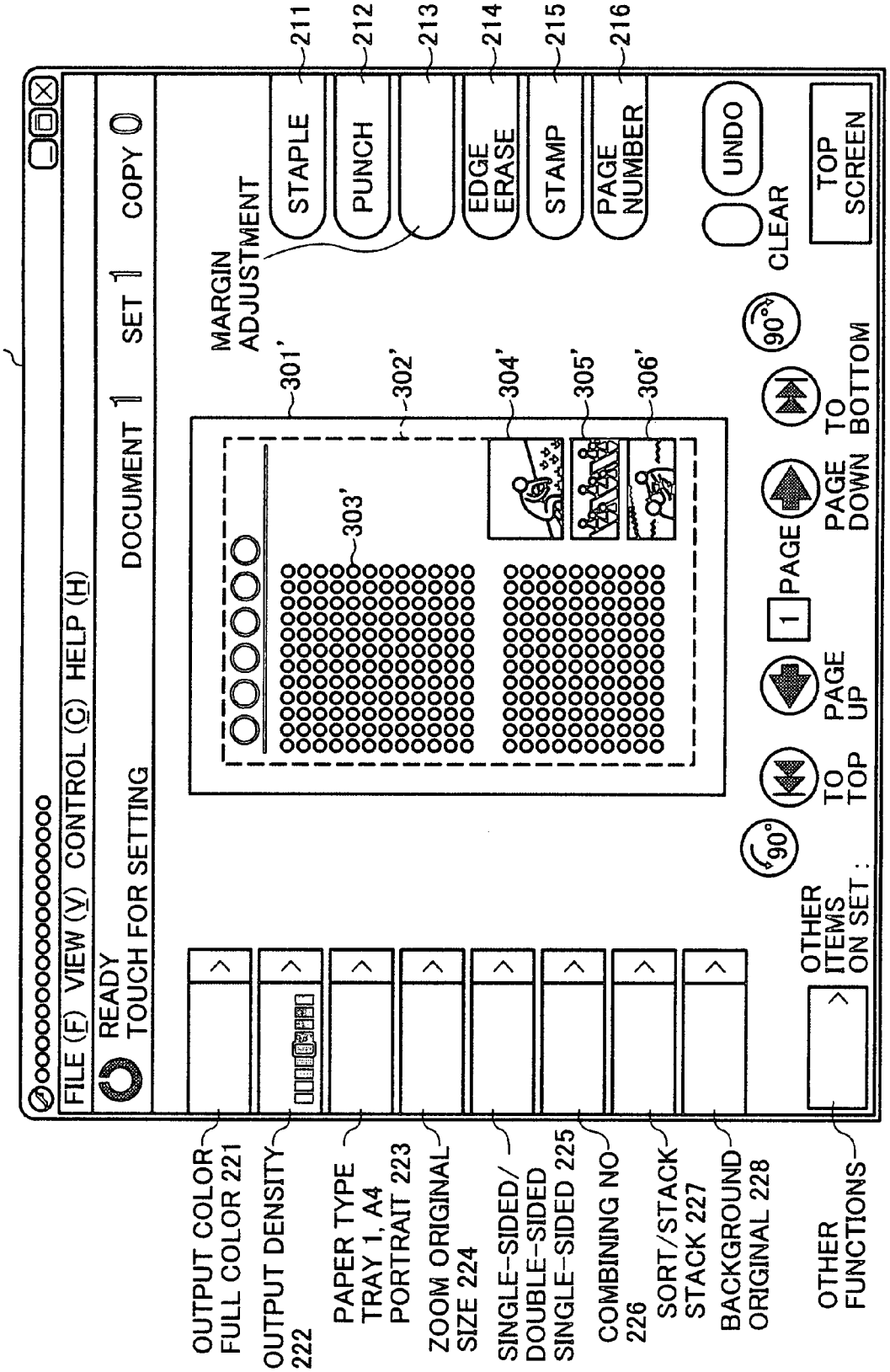

FIG. 3B is a schematic for explaining another example of a display of the area-representing image and the functions by the operation display unit 15. In the image for the entire document 301', the text area 303', photo areas 304'-306' are displayed, including that the image types can be distinguished clearly.

As explained above, the area-representing images can be displayed by the operation display unit 15, as the area-representing image 202 for the visual identification of only the identifiable image data of the frame (FIG. 2), as the various areas or the interior of the frame (FIG. 3A), and as the various areas by which the image types of the areas can be distinguished.

The operation display unit 15 displays, for the various processing functions performed to the input data, a staple 211, a punch 212, a margin adjustment 213, an edge erase 214, a stamp 215, and a page number 216 selected by the function selecting unit 14 on the right side of the screen.

The operation display unit 15 also displays output color 221, output density 222, paper type 223, zoom 224, single-sided/double-sided 225, combining 226, sort/stack 227, and background 228, on the left side of the screen.

The preview generating unit 13, for the portions in each page in which no image is present (the background), adjusts to a predefined transparency, and for the portions in each page in which the image is present, performs processing for transparency/density adjustment for adjusting to a predefined density, to generate transparent preview image data. The adjustment processing will be hereinafter described. The preview generating unit 13 includes a buffer for displaying preview image (FIG. 4).

FIG. 4 is a schematic for explaining a configuration of the buffer. The preview generating unit 13 stores, the area-representing image data or the transparent preview image data generated by the area generating unit 12, into each layer for displaying the preview image explained schematically in FIG. 4, sequentially from page 1 to page n.

The preview generating unit 13, through an appropriate setting of a transparency parameter value and a density parameter value (only transparency parameter is explained in FIG. 4) for the area-representing images included in each page (layer) and stored page-by-page in the buffer, performs processing for transparency/density adjustment, through which the transparency of the portions in which no image is present is defined to a predefined transparency, and the portions in which the image is present, i.e., the area-representing image, is defined to a predefined density, to generate the area-representing image data stored in the buffer into the transparent preview image data. For example, the preview generating unit 13, through defining the transparency parameter value of the each portion in which no image is present included in each page (layer) stored in the buffer, to be 100 percent, enables the portions (the backgrounds) in all pages to be transparent.

Also, the preview generating unit 13, for the area-representing image data included in each page (layer) and store in the buffer, defines the density parameter to be a predefined parameter value, for example, 100 percent or the default density, enables the area-representing image data included in the entire pages to be seen through from the portions in which no image is present. The preview generating unit 13 can adjust the transparency parameter value of the portions in which no image is present, within the range of 0 to 100 percent, wherein the value is proportional to the density, and thus, smaller the value, the density is higher, and larger the value, the density is lower, enabling the area in a lower layer (later page) to be seen through.

Also, the density parameter values for the portions in which the images are present can be defined arbitrarily from 0 percent to, for example, 20, 50, 80, 100, and 120 percent, wherein the value is proportional to the density, and when overlapped and displayed, larger the value, the recognition is higher. When the density parameter value is 0 percent, the portion in which the image is present is erased, while at 100 percent, the density equals the density according to the scan by the scanner 1.

As described above, for the transparent preview image data, the portion in which no image is present is defined to a predefined transparency parameter value, for example, 100 percent, and the portion in which the image is present is defined to a predefined density parameter value, for example, 100 percent. Thus, according to a transparency parameter value, or the transparency of a pixel value of an X-Y coordinate in a layer (page), a layer a layer beneath another layer can be seen through.

The preview generating unit 13, for all the X-Y coordinates or the pixel value P, determines whether the value is for a presence of the image (a pixel is for an image portion in which contents such as the text, photo, and the like is present), or for none-presence of the image, and exclusively replaces the pixel values for the none presence into a value indicating "transparency" (the value is described as "transparency" hereinafter).

The preview generating unit 13 generates the new and lowest layer in the buffer for the display by the operation display unit 15, and stores the area-representing image generated by the area generating unit 12 into the layer.

The preview generating unit 13 stores the area-representing image data generated by the area generating unit 12 into the new layer, defines the transparency and the density parameter value of the area stored in the layer, and generates the data into the transparent preview image data, for the display by the operation display unit 15.

The preview generating unit 13, then, performs likewise processing starting from reading next page of the document, stores the area-representing image data into another new layer in the buffer, defines the transparency and the density parameter value of the area-representing image in the new layer, generates the preview image data, and generates the transparent preview image data, enabling the data to be displayed by the operation display unit 15.

Thus, the preview generating unit 13, by reading all the pages of the document, generating the overlapping preview images for all the pages of the document, such as an area-representing image 551 explained in FIG. 5, enables the display by the operation display unit 15.

FIG. 5 is a schematic for explaining an example of a display of an area-representing image of a scanned document and an overlapping display of the area-representing images. In an image 510 in page 1, an area-representing image 511 is displayed in a frame. Likewise, pages 2 to 4 are displayed as preview images 520, 530, and 540. Also, area-representing images 521, 531, and 541 are displayed in the frames or borderlines. The area-representing image 551 is an overlapping image of the above images, and is displayed in an overlapping-preview image display 550.

In the overlapping-preview image display 550, the area-representing image 511 in page 1 is displayed within a borderline or a bold line, including that the data contents for the area-representing image 511 is also displayed. The background not directly related to the contents is preferred to be transparent. For the pages 2 to 4, the data contents for the, area-representing image are not displayed, and the borderline that is hidden when overlapped is displayed by a dotted line, while the borderline not hidden is displayed by a narrow but full line. Through the display described above, the overlapping area-representing images in each page are confirmed simply.

When a specification input by the user is performed by selecting functions through the operation display unit 15, the preview generating unit 13 generates the preview image including the specified processing, for the display by the operation display unit 15. Thus, the preview image is generated based on the area-representing image to which various processing are performed, the transparent preview image is generated by adjusting the image portions in which the image is not present to a predefined transparency, to enable the display of the overlapping and transparent preview images for all the pages, by the operation display unit 15.

In addition, by the specification input through the operation display unit 15, the area-representing image data for a specific page can be exclusively displayed, by storing the specific data into the buffer.

The output processing unit 3 performs the image processing to the input data according to the setting by the user interface device 10. The image output unit 4 performs printing on papers, based on the image data to which the processing by the output processing unit 3 is performed and setting for the printing, performs, through the post-processing function included in the image output unit 4, the post-processing according to the final setting, and outputs the processed papers.

Thus, the state of the processing result according to the setting, for the images included in the entire pages consisting of a plurality of pages, the area-representing images can be exclusively and visually confirmed, while others are transparent in the preview image, so that the comprehensive layout can be simply confirmed, and a specific target page for confirmation can be easily searched, for the usability improvement.

When the user modifies or resets the setting for a specific page and/or an entire pages through operating the operation display unit 15 by seeing the overlapping display on the operation display unit 15, the preview generating unit 13 generates the preview image based on the new setting, rewrites the image in the buffer into another preview image, to be displayed by the operation display unit 15.

Therefore, setting modifications can be simply performed through visual confirmation of the overlapping images of the entire pages, and the modified image can be further confirmed, for a more appropriate setting by simple operation.

On the operation display unit 15, for the portions of the preview images of the overlapping pages, for example, the images 510 to 540 in FIG. 5 can be displayed as a list. For the case, a button for switching mode to the image portions list (not shown) is installed in the operation display unit 15, and configured for accepting the mode switching.

Figure 6:
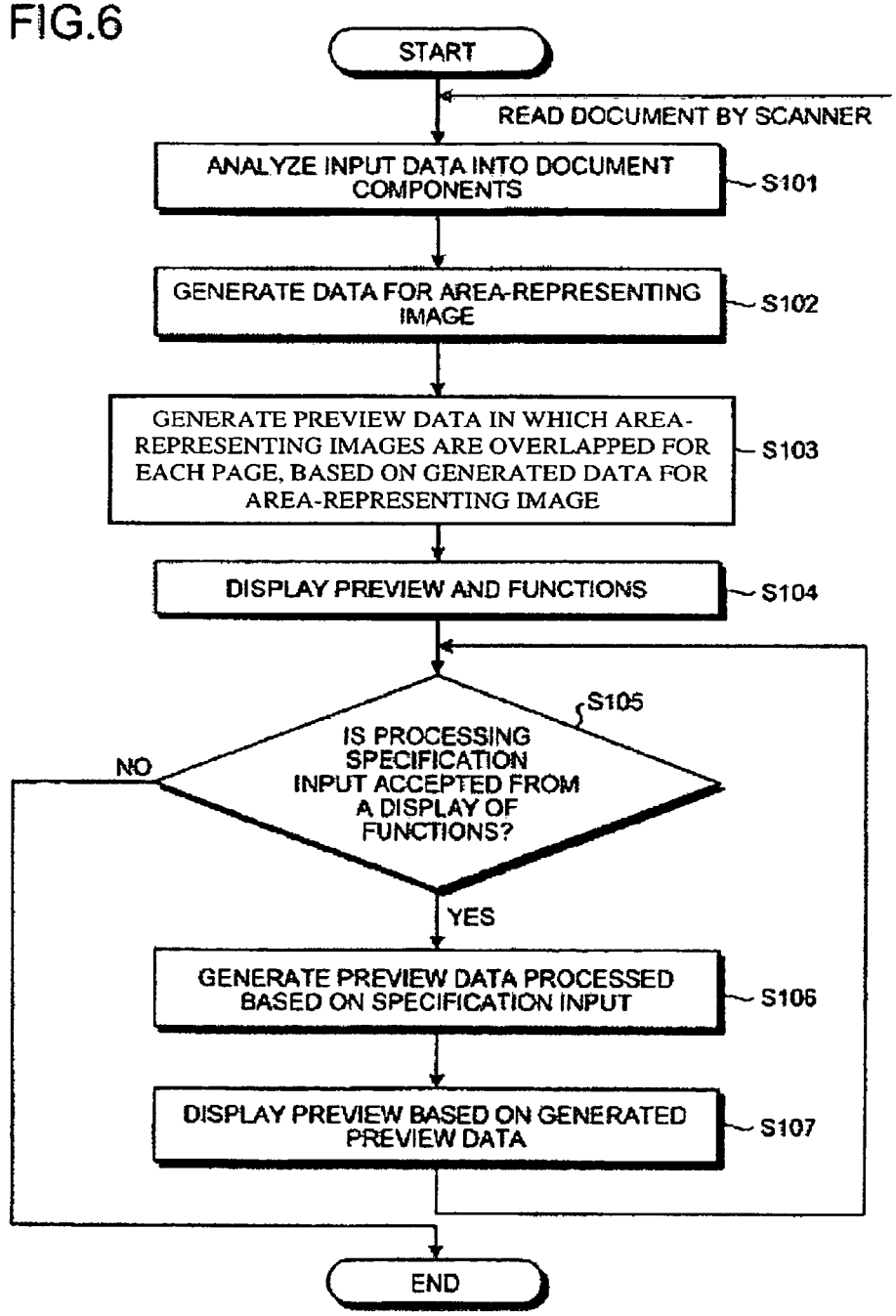
FIG. 6 is a flowchart of an image displaying process by the user interface device according to the first embodiment.

FIG. 6 is a flowchart explaining steps for a preview image display in a user interface device according to a first embodiment of the present invention. The scanner 1 reads the document, the data processing unit 2 performs analog/digital conversion, and the analyzing unit 11 receives the converted image data. The analyzing unit 11 analyzes the input data into document components. The analyzing unit 11 performs analysis for the characteristic values for the state of the document, the image, and the layout, independently for each characteristic value (step The area generating unit 12, based on a result of the analysis by the analyzing unit 11, generates the area-representing image data indicating a defining of an area for the data that the input data occupies each page, for each page. The area-representing image data can be generated as, as explained in FIG. 2, the data for the display by a borderline, and without the image type distinction. Or, as explained in FIG. 3A, the data can be generated for area-representing image according to the image types. Or, as explained in FIG. 3B, the data can be generated for the distinction of the contents of the area (step S102).

The preview generating unit 13 stores the area-representing image data into a buffer for preview image display, defines various parameters, and performs setting for the density of the image, transparency of the area in which no image is present, and overlapping display (step S103).

The operation display unit 15 displays, according to the preview image generated by the preview generating unit 13, the preview in which the area-representing images in each page are overlapped, and the data for processed functions performed to the input data. Also, as explained in FIG. 2, the operation display unit 15 displays the functions to be selected by the function selecting unit 14 based on the result of the analysis by the analyzing unit 11 (step S104).

The operation display unit 15 detects whether the specification input is accepted form the displayed functions (step S105). When the operation display unit 15 detects the specification input (yes, at step S105), the preview generating unit 13 performs processing according to the accepted specification input, and generates the data for the preview display after the processing is performed. For example, when the punch 212 is specified through input by touching, the preview generating unit 13 generates the punch holes into the image 201 in FIG. 2 (step S106), stores the generated data into the layer in the buffer, so that the operation display unit 15 displays the punch holes on the data.

The operation display unit 15 overlaps the stored punch-hole data, added to the area-representing image data that has been generated and stored, displays the preview in which the punch-hole image is overlapped on the overlapped images in the pages (step S107).

The area generating unit 12 can generate the area-representing image data for the display by the borderline only. The generation enables displaying of the preview image in which only the borderlines are seen to be overlapping, for a simple visual confirmation and can inform that the display is for shortened processing time.

Furthermore, the area generating unit 12 can generate, at least one of the entire area and the defined area, in transparent colors and with the borderline emphasized. Thus, the identifiable data areas are displayed in transparent colors, and the borderlines for the areas are vividly displayed, for the plurality of pages, for a simple and visual confirmation of the position for the presence of a target page.

Thus, the user interface device according to the first embodiment of the present invention, for the information comprising images in the plurality of pages, the images in each page to which the specified processing is performed are displayed as identifiable, overlapping, and transparent area-representing images, so that the comprehensive layout can be simply confirmed, through the transparent preview image for the entire pages, when image output is performed for the plurality of pages.

Figure 7:
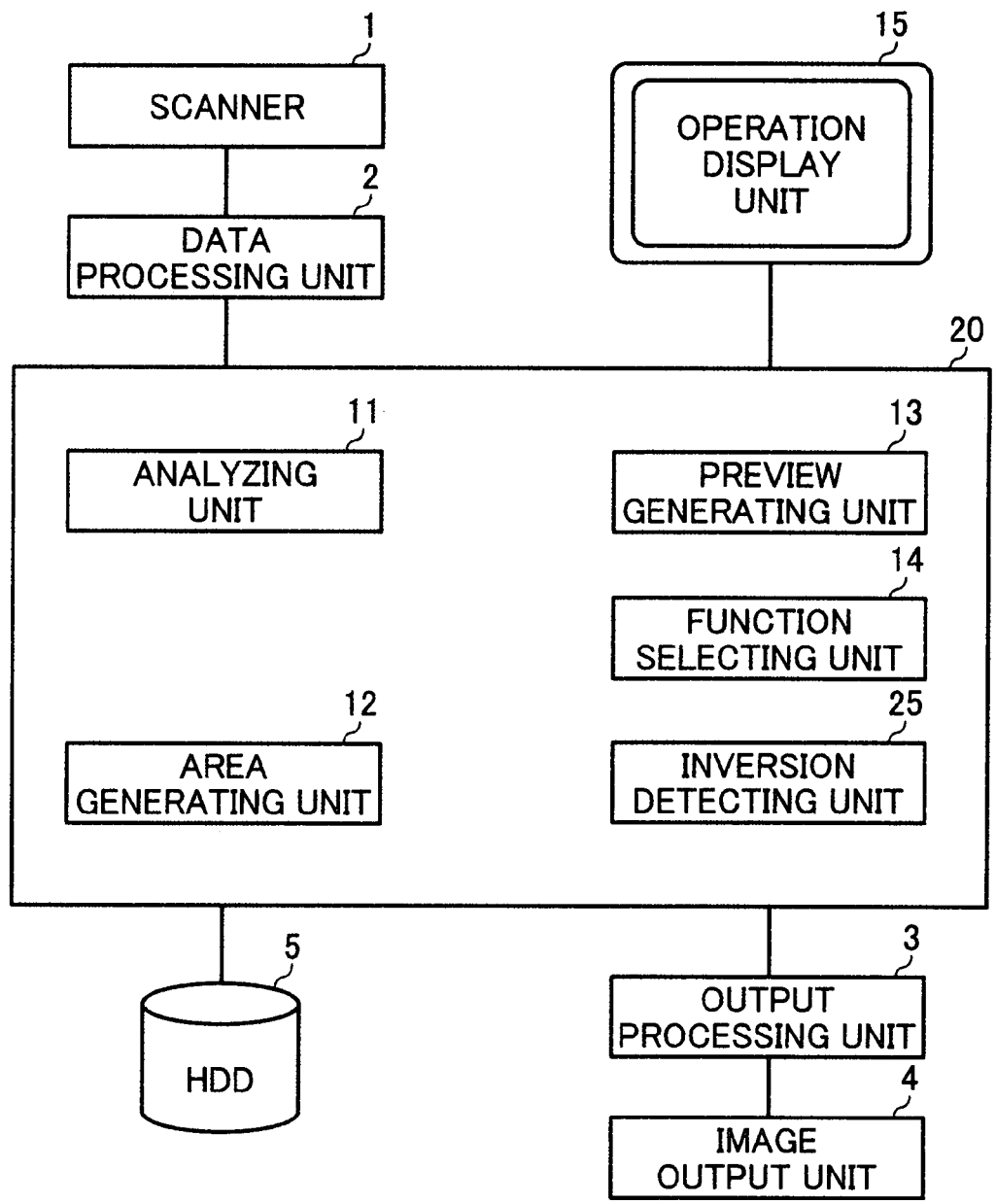
FIG. 7 is a functional block diagram of an image forming apparatus including a user interface device according to a second embodiment of the present invention.

FIG. 7 is a block diagram explaining functions of an image forming apparatus including a user interface device 20 according to a second embodiment of the present invention. The user interface device 20 further includes an inversion detecting unit 25.

The user interface device 20 differs to the apparatus according to the first embodiment of the present invention, in that the apparatus includes the inversion detecting unit 25. The inversion detecting unit 25, when the unit detects a demanding signal for a double-sided output, generates the area-representing image data generated by the area generating unit 12 into the area-representing image data for an inverted display. The preview generating unit 13, according to the inverted data of the area-representing image generated by the inversion detecting unit 25, enables the operation display unit 15 to display the preview for the inverted output.

Thus, when the input data is output by the double-sided printing, the area-representing image included in the front page and the area-representing image included in the back page, of a page, are inverted to each other in the preview, so that a comprehensive layout is simply confirmed through the inverted and transparent preview, for double face printing of the entire pages.

Figure 8:
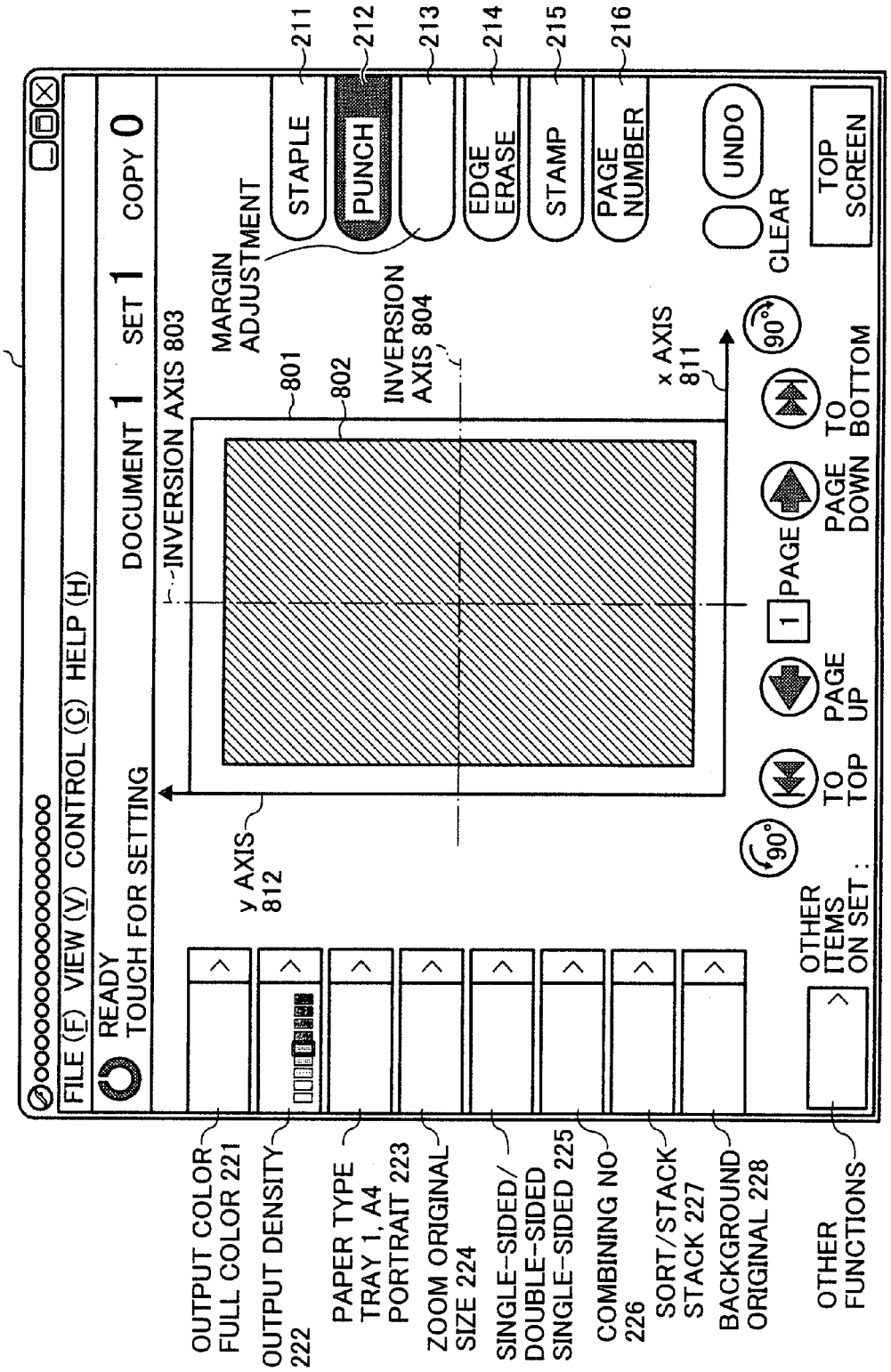
FIG. 8 is a schematic of an inverted display of an area-representing image.

FIG. 8 is a diagram explaining the inverted display of the area-representing images on the operation display unit 15. The inversion detecting unit 25, for example, the double-sided printing is specified by an input through the double-sided printing button 225 (FIG. 2), detects that the setting for an inverted output is performed.

The inversion detecting unit 25, when detecting the inversion setting, defines the main scanning direction and the sub-scanning direction as an X axis 811 and Y axis 812 (FIG. 8), relatively, through the area-representing image data. The origin is defined at a lower left of the page.

In an image 810 of the area-representing image, when the a page is turned from an axis parallel to the Y axis, the lowest and largest value in the X axis direction of the coordinates for the area-representing image are acquired, and an axis including the midpoint for the values on the X axis and parallel to the Y axis is defined as an inversion axis 803. By folding the page from the inversion axis 803 including that the coordinates are symmetrical, the data for the inverted area-representing image is acquired.

The preview generating unit 13 stores the inverted data instead of the present data in the appropriate layer in the buffer, to enabling the operation display unit 15 to display the inverted and transparent image data.

Thus, when the input data is output though double-sided printing, the preview includes that the area-representing image included in the front page and the area-representing image included in the back page are inverted to each other, overlapped, and transparent, so that the layout preview is accurately confirmed, when all the pages of a plurality of pages are output through the double sided printing.

Figure 9:
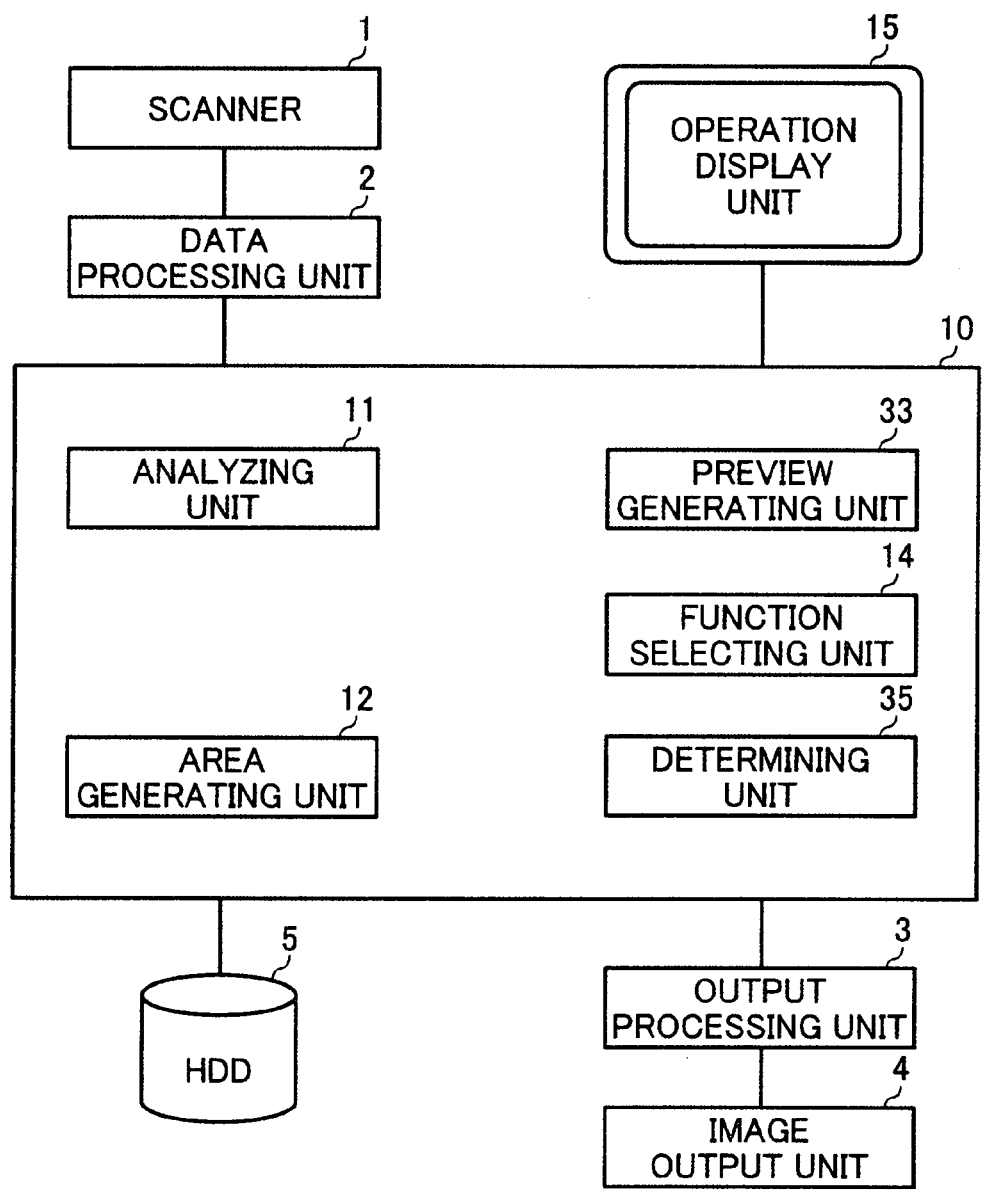
FIG. 9 is a functional block diagram of an image forming apparatus including a user interface device according to a third embodiment of the present invention.

FIG. 9 is a block diagram explaining functions of an image forming apparatus including a user interface device 30 according to a third embodiment of the present invention. The user interface device 30 further includes a determining unit 35.

The user interface device 30 differs to the apparatus according to the first embodiment of the present invention, in that the apparatus includes the determining unit 35. The determining unit 35, when a post-processing such as stapling and punching is specified for the input data, determines whether a trouble in an output image including an overlapping of the processing result and an area-representing image generated from the document. When the trouble is determined to occur, a preview generating unit 33 shifts the area-representing image included in a page to which the trouble is determined to occur, within the page, to avoid the trouble. Then, the preview generating unit 33 generates the preview image including that the processing for the avoidance is performed, for the display by the operation display unit 15.

Thus, when a trouble such as a defect of an identifiable data in the output image by the specified setting for the post-processing occurs, the setting for avoiding the trouble and the preview display can be performed.

Figure 10:
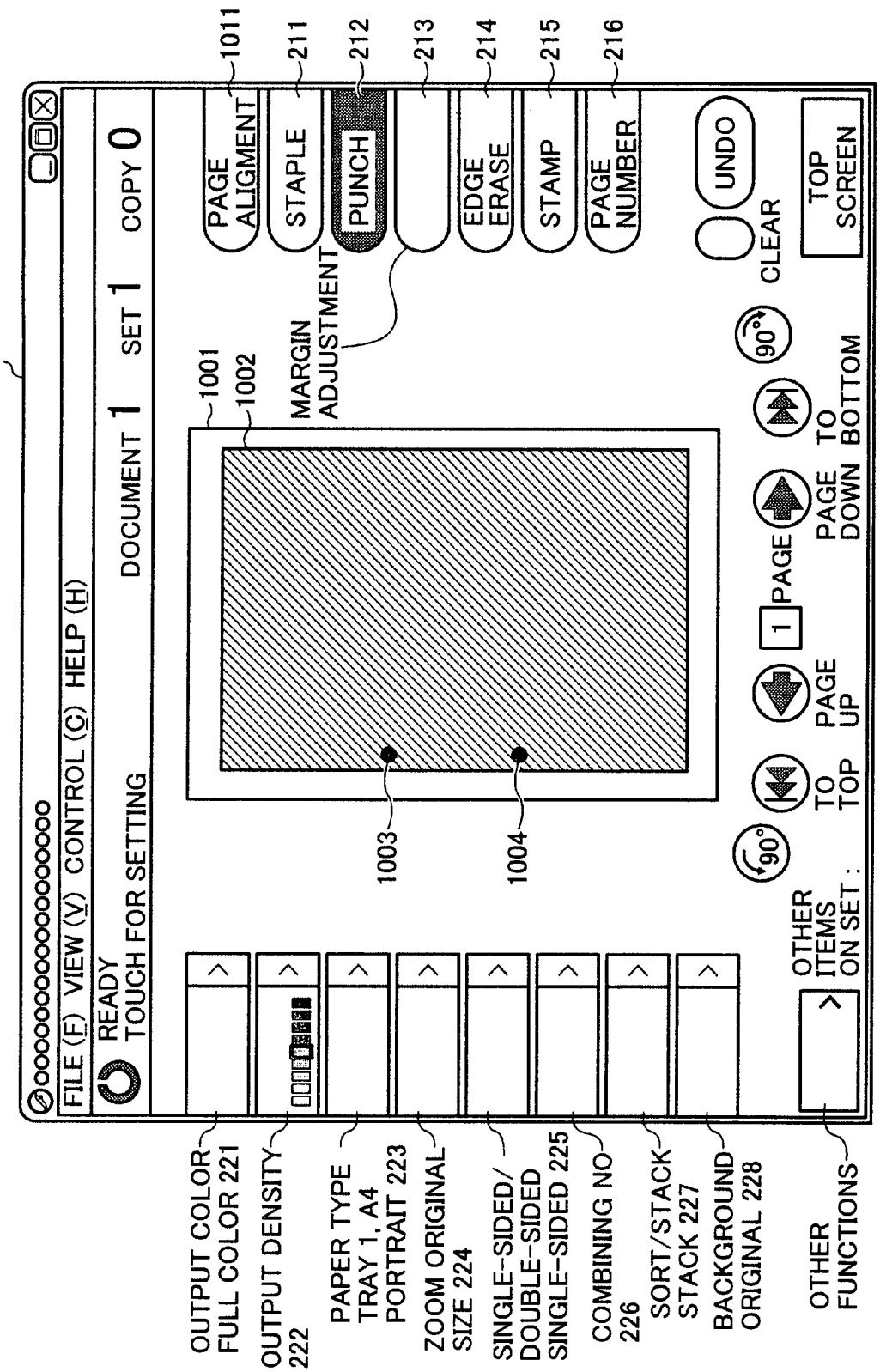
FIG. 10 is a schematic for explaining a troubleshooting for the user interface device according to the third embodiment.

FIG. 10 is a diagram explaining the occurrence and the avoidance of the trouble. Generally, stapling and punching are specified for the post-processing. The determining unit 35, for example, when the setting for the post-processing is detected, refers to the characteristic parameter value acquired from the analyzing unit 11, and when the processing according to the setting is performed, determines whether an enough margin is present at the position to which the processing is performed. The determining unit 35 can automatically make a determination, or may be configured for accepting the specification input by the user.

Then, the determining unit 35, when enough margins are not present, for example, as explained in FIG. 10, a punch-hole 1003 and a punch hole 1004 are overlapping an area-representing image 1002, causing the defect o the image data for the area-representing image 1002, the preview generating unit 33 generates the area-representing image data after shifting the area-representing image data to a right, for the preview display. Also, in the case, the preview generating unit 33 may be configured for a reduced display, added to the shifting. Also, the settings for the reducing and the shifting may be configured for accepting the specification input by the user.

The preview generating unit 33, by shifting the data by a predefined value to the X axis direction in the coordinates, generates the area-representing image data to which the shifting is performed, and by storing the data into the layer of a buffer for displaying the preview image, through replacing the conventional data, so that the display of the area-representing image to which the punch-holes are overlapping is modified into the display without the overlapping.

Thus, for the page to which the trouble is determined to occur, the occurrence of the trouble is displayed through the display for the entire pages. Also, the trouble is automatically avoided, while the result, to which the processing after the avoidance is performed, is displayed for a simple and comprehensive layout confirmation.

Here, the preview generating unit 33 may be configured for generating the preview image by shifting an area-representing image included in a page to which the trouble is determined to occur, uniformly to at least one of the horizontal and vertical directions.

Thus, for example, when a stapling is processed to an upper left of a page, the area-representing image in each page can be shifted uniformly to the directions right and bottom, within the page for the page layout. Thus, the setting can be performed for an appropriate layout in which the stapling position is not overlapping the area-representing images, so that the preview is displayed for a simple confirmation.

Here, the preview generating unit 33 may be configured for generating the preview image by shifting an area-representing image included in a page to which the trouble is determined to occur, independently to at least one of the horizontal and vertical directions.

Thus, for example, when a stapling is processed to an upper left of a page, shifting of the area-representing image in each page can be independently determined for each page, for example, to the right or bottom directions within the page. Thus, only the pages in which the stapling position and the area-representing image overlaps can be extracted for the layout setting to avoid the overlapping, and the preview image is displayed for the simple confirmation.

Here, the preview generating unit 33 may be configured for generating the preview data through shifting area-representing image in each page, by aligning to at least one of the left, right, top, and bottom side of a frame.

Thus, for example, when a stapling is processed to an upper left of a page, the area-representing image in each page can be shifted to a predefined position nearer to the position to which the stapling is processed, within the page for the page layout. Thus, the setting for the layout in which each page is shifted from the stapling position by a predefined value, and the preview image is displayed for the simple confirmation.

Figure 11:
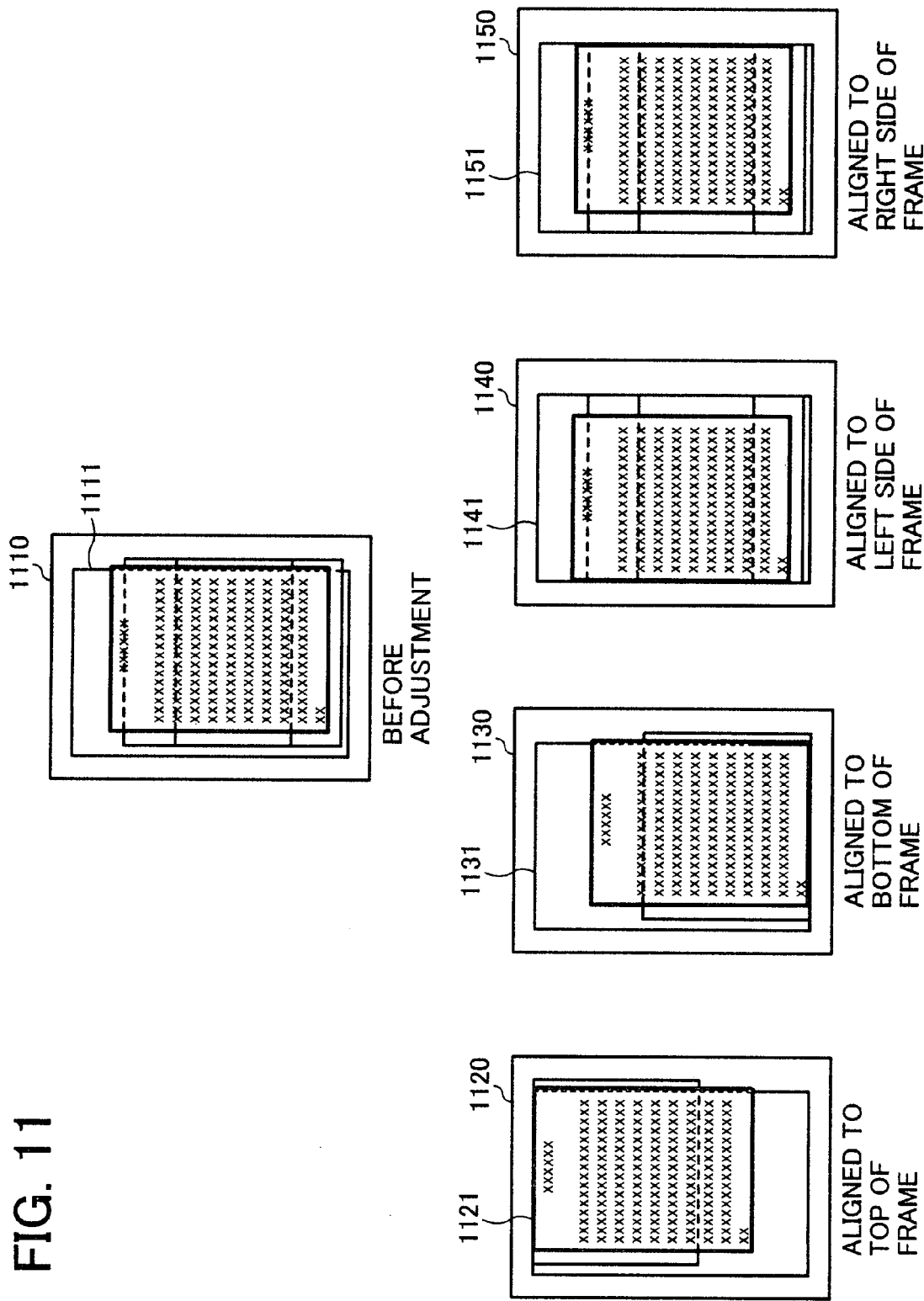
FIG. 11 is a schematic for explaining a setting of aligning area-representing images of each page to a predetermined reference line.

FIG. 11 is a block diagram explaining the setting by which the area-representing image in each page are aligned to a predefined frame side. In the configuration, the operation display unit 15 displays by accepting a specification of at least one of the frame sides, left, right, top, and bottom (not illustrated), and the preview generating unit 33 generates the preview data including that the area-representing images are shifted according to the accepted specification of the frame side, for the display by the operation display unit 15.

In FIG. 11, in an overlapping preview image before a aligning processing 1110, the area-representing images included in each page are only overlapped, as illustrated as an area-representing image 1111. When the specification for aligning to the top side of the frame is performed, the area-representing images in each page are displayed, overlapped, and aligned to the top side of the frame (1121). Likewise, when the specification for aligning to the bottom side of the frame is performed, the area-representing images in each page are displayed, overlapped, and aligned to the bottom side of the frame (1131). Likewise, it is the same when the specification for aligning to the right and left side of the frame is performed (1141, and 1151, respectively).

Thus, for example, when the stapling is processed to the upper side of the frame, the area-representing image in each page can be shifted by a predefined distance for the page layout, so that an appropriate layout setting can be performed, and the preview image is displayed for the simple confirmation.

Figure 12:
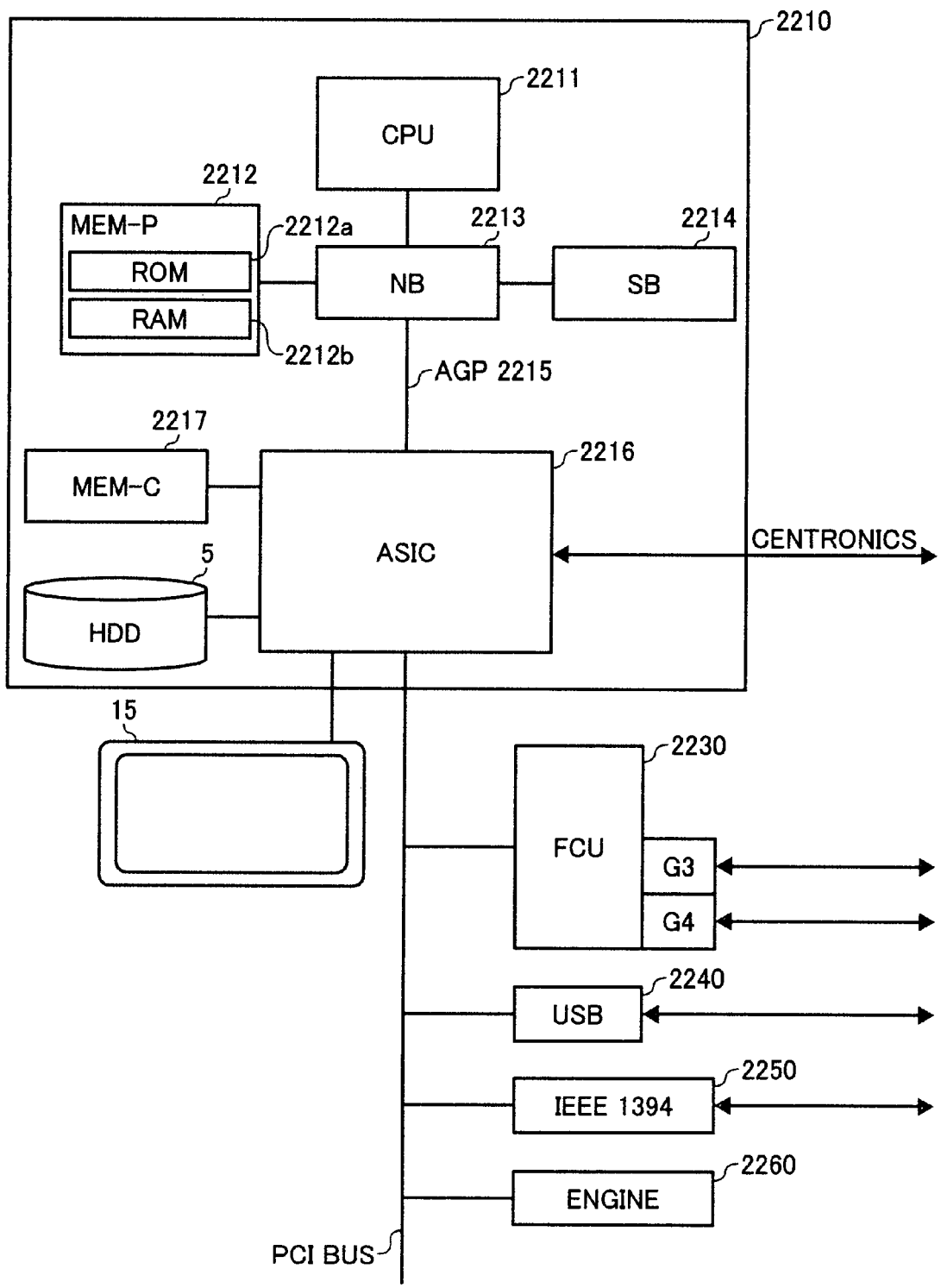
FIG. 12 is a block diagram of a hardware configuration of an image forming apparatus including the user interface device according to the present invention.

FIG. 12 is a block diagram illustrating a hardware configuration of the image forming apparatus including the user interface device. The apparatus is configured as an MFP device including multiple functions for faxing, scanning, and the like. The component includes a controller 2210 and an engine 2260, wherein the components are in communication via a peripheral component interconnect (PCI), or a bus. The controller 2210 controls the information input from FCUI/F2230 and the operation display unit 15, including holistic controls for the MFP, image display controls, various controls, image processing controls. The engine 2260 includes image processing engine that can communicate via the PCI, and includes units that performs, for example, trouble diffusion and a gamma correction to the acquired image data.

The controller 2210 includes a central processing unit (CPU) 2211, a north bridge (NB) 2213, a MEM-P (system memory) 2212, a south bridge (SB) 2214, a MEM-C (local memory) 2217, an application specific integrated circuit (ASIC) 2216, and an HDD 5. In the configuration, the NB 2213 and the ASIC 2216 are in communication via an accelerated graphics port (AGP) bus 2215. The MEM-P 2212 includes a read only memory (ROM) 2212a and a random access memory (RAM) 2212b.

The CPU 2211 performs the holistic control for the MFP, and includes a chipset comprised of the NB 2213, the MEM-P 2212, and the SB 2214, via which the CPU 2211 communicates with other devices.

The NB 2213 performs as the bridge via which the CPU 2211 communicates the MEM-P 2212, the SB 2214, and the AGP 2215, and includes a memory controller that controls each read/write for the MEM-P 2212, and a PCI master and an AGP target.

The MEM-P 2212 performs as a system memory to be utilized for storage and read/write of the programs and the data, and includes the ROM 2212a and the RAM 2212b. The ROM 2212a exclusively performs reading, and is utilized for storage of the program and the data. The RAM 2212b can perform read/write, and the utilization of which may be for read/write of the programs and the data, and for image-drawing for the image processing.

The SB 2214 performs as a bridge through which the NB 2213 communicates with the components of the PCI area and the peripheral components. The SB 2214 communicates the NB 2213 via the PCI bus, also via which the FCUI/F2230 are communicated as well.

The ASIC 2216 performs as an integrated circuit (IC) that includes hardware logic for the multi-media information processors, through which each of the following are communicated; the AGP 2215, the PCI bus, the HDD 5, and the MEM-C2217.

The ASIC 2216 communicates, while in a collaboration with the PCI target and the AGP master, an arbiter circuit (ARB) which performs a key function within the ASIC 2216, the memory controller that controls the MEM-C 2217, a multiple direct memory access controller (DMAC) that performs processing including a rotation of the images, the engine 2260, via the PCI bus, with a universal serial bus (USB) 2240 and an interface 2250 for the standard the Institute of Electrical and Electronics Engineers (IEEE) 1394.

The MEM-C2217 performs as a local memory utilized for a buffer for sending images and the buffer for the coding the information. The HDD 5 performs as the storage that accumulates the following data for the following; images, programs, fonts, and the form.

The AGP 2215 performs as a bus interface utilized for the graphics accelerator card that has been proposed for the acceleration of the illustrations processing, and enables a faster performance of the cards, through a direct access by a high through put to the MEM-P2212.

The ASIC 2216 communicates with the operation display unit 15. The operation display unit 15 accepts the specification from the users, and sends the information for the specification that is accepted by the ASIC 2216.

The program for displaying the images executed by the MPF including the user interface device according to the embodiments of the present invention is provided through the storage of the program into the ROM, and the like.

The program for displaying the images executed by the MPF including the user interface device according to the embodiments of the present invention may be configured for provision through the storage by the media readable by the computers, such as a compact disk-read only memory (CD-ROM), a flexible disk (FD), a compact disk recordable (CD-R), and a digital versatile disk (DVD). The programs are to be format into installable or executable files for the storage to be performed.

The program for displaying the images executed by the MPF including the user interface device according to the embodiments of the present invention may be configured for provision and distribution via the computer networks including the Internet. The program can be stored within another computer, and downloaded via a network for the provision and the distribution.

The program for displaying the images executed by the MPF including the user interface device according to the embodiments of the present invention is configured for the module including the units described above (including the analyzing unit 11, the area generating unit 12, the preview generating unit 13, the function selecting unit 14, and the operation display unit 15). The components that enable the processing of the program are the CPU and the ROM, in which the CPU performs the reading and the execution of the programs from the ROM. Thus, each of the units including the analyzing unit 11, the area generating unit 12, the preview generating unit 13, the function selecting unit 14, and the operation display unit 15 are generated independently, within the above component for the storage.

The embodiments and modifications described above are only for explanation of the present invention, and the present invention is not limited to the specific examples described above.

According to an embodiment of the present invention, an input data is analyzed into document components, an overlapping area-representing image data is generated for each page, the overlapping area-representing image data is displayed as a preview, available functions are displayed and specified functions are accepted, and the preview is displayed for further specifications. Through the configuration above, for the input image data including a plurality of pages, the images processed according to the specification are displayed as an overlapping and transparent preview, so that a user can simply confirm the layout for all the pages.

Furthermore, according to an embodiment of the present invention, the input data is analyzed into image types, the area-representing image is defined according to the image types, and the images are displayed according to the defined image types, so that the user can simply confirm the layout for all the pages.

Moreover, according to an embodiment of the present invention, borderlines of the entire area and/or the defined area are displayed, so that the user can simply confirm the layout for all the pages.

Furthermore, according to the present invention, the entire area and/or the defined are displayed transparently and with the borderlines emphasized, so that the user can simply confirm the layout for all the pages.

Moreover, according to an embodiment of the present invention, when the page-by-page data included in the input data is output through double sided printing, the overlapping and transparent result data is displayed thorough inversion, wherein the area-representing image on the front page and the area-representing images on the back page are inverted to each other so that the user can simply confirm the layout for all the pages.

Furthermore, according to an embodiment of the present invention, when the specified post-processing is performed, and when troubles including the overlapping of positions of the area-representing images and a result of the post-processing is pre-determined to occur, the area-representing image included in the page in which the occurrence is pre-determined is displayed by shifting the area-representing images to another position within the page to avoid the trouble. Thus, the occurrence is displayed for simple confirmation of all the pages, and when the occurrence is avoided, the preview of the result of the avoidance is displayed, so that the user can simply confirm the layout for all the pages.

Moreover, according to an embodiment of the present invention, the area-representing image included in the page in which the occurrence is pre-determined is displayed by uniformly shifting the area-representing images to at least one of the following directions within the page, for each page, to avoid the overlapping; rightward, leftward, upward, and downward. Thus, the user can simply confirm the layout for all the pages, when the occurrence is avoided.

Furthermore, according to an embodiment of the present invention, the area-representing image included in the page to which the occurrence is pre-determined is displayed by independently shifting the area-representing images to at least one of the following directions within the page, for each page, to avoid the overlapping; horizontally and vertically. Thus, the user can simply confirm the layout for all the pages, when the occurrence is avoided.

Moreover, according to an embodiment of the present invention, the area-representing image included in each page is displayed by shifting through aligning to at least one of the following ends of the frames as norms; each of the horizontal ends and each of the vertical ends. Thus, the user can simply confirm the layout for all the pages, when the occurrence is avoided.

Furthermore, according to an embodiment of the present invention, an image forming apparatus includes a data input unit that inputs data including page-by-page data, a user interface device that displays the input data and accepts the setting through the specified functions, and an image output unit that outputs the input data wherein the data includes the accepted setting by the function specification. The image forming apparatus displays, for the input data including images included in the plurality of pages, identifiable, overlapping, and transparent area-representing images to which the specified processing is performed, page-by-page. Thus, an image display method through which the user can simply confirm the layout for all the pages is provided.

Moreover, according to an embodiment of the present invention, the image forming apparatus displays input data including image data of a plurality of pages in a state that the display of identifiable, overlapping, and transparent area-representing image for the images to which specified processing is performed. Therefore, the image forming apparatus enable the user to simply confirm the layout for all the pages.

Furthermore, according to an embodiment of the present invention, the input data is analyzed into document components, the area-representing image data that indicates the defining of the data area within the input data that occupies each page is generated based on the analysis, the preview display data for the input data is generated into overlapping area-representing image data, page-by-page, the function specification data is displayed to accept the function specification input through the display, the preview according to the specification is displayed, and further modifications of the specifications are accepted. The above configuration, through the display of identifiable, overlapping, and transparent area-representing image for the images to which specified processing is performed, provides an image display method through which the user can simply confirm the layout for all the pages.

Moreover, according to an embodiment of the present invention, the input data is analyzed into image types, the area-representing image is defined according to the image types, and the images are displayed according to the defined image types, so that the user can simply confirm the layout for all the pages.

Furthermore, according to an embodiment of the present invention, the borderlines of the entire area and/or the defined area are displayed, so that the user can simply confirm the layout for all the pages.

Moreover, according to an embodiment of the present invention, the entire area and/or the defined area are displayed transparently and with the borderlines emphasized, so that the user can simply confirm the layout for all the pages.

Furthermore, according to an embodiment of the present invention, at least one of the image displaying methods described in the claims 12 to 15 can be executed by a computer.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A user interface device for displaying input information including page-by-page information and accepting a setting of a function, the user interface device comprising:
a processing unit including at least one computer processor;
an analyzing unit that uses the processing unit and analyzes components of the input information;
an area generating unit that uses the processing unit and generates information on an area-representing image that represents defining of an area occupied by meaningful information in each page of the input information, based on a result of analysis by the analyzing unit;
a preview generating unit that uses the processing unit and generates information on a preview into which the area-representing image is overlapped for each one page of at least two pages, based on the information generated by the area generating unit on the area-representing image,
the area-representing image is one selected from a group consisting of a borderline of the area and a symbolic representation of the meaningful information, the symbolic representation being configured only to make it possible to distinguish positions of areas, each of which is occupied by a corresponding one of different image types of images represented by the meaningful information, or only to make it possible to distinguish an image type of an image represented by the meaningful information; and
an operation display unit that uses the processing unit and displays the information on the preview generated by the preview generating unit, displays information on a function to be performed on the input information, and accepts an instruction for setting the function from a display of the information on the function,
wherein when the operation display unit accepts the instruction, the preview generating unit further generates information on a preview after performing a processing according to the instruction, and
wherein the area-representing image selected from the group consisting of the borderline of the area and the symbolic representation of the meaningful information for one page of said at least two pages is directly overlapped in the preview, without any offset, with another area-representing image of another page of said at least two pages, in a case that the area-representing image and said another area-representing image have same positions on the respective pages of said at least two pages.

2. The user interface device according to claim 1, wherein the input information includes at least one type of image, the analyzing unit analyzes an image type of the image included in the input information, and
the area generating unit generates the information on the area-representing image in such a manner that the area is defined for each analyzed image type.

3. The user interface device according to claim 1, wherein the area generating unit generates the information on the area-representing image in such a manner that a borderline of at least one of an entire area and a defined area is displayed.

4. The user interface device according to claim 1, wherein the area generating unit generates the information on the area-representing image in such a manner that at least one of an entire area and a defined area is displayed with a transparent color and an emphasized borderline.

5. The user interface device according to claim 1, wherein upon receiving a signal for requesting an output of page-by-page information included in the input information in both sides including a front side and a back side, the preview generating unit generates the information on the preview in such a manner that an area-representing image of the front side and an area-representing image of the back side are displayed in an inverted state.

6. The user interface device according to claim 1, further comprising:
a determining unit that uses the processing unit and determines, when a finishing processing for a preview of the input information is perform based on the instruction, whether a trouble including an overlapping of a result of performed finishing processing and a position of the area-representing image occurs, wherein
when it is determined that the trouble occurs, the preview generating unit generates the information for the preview in such a manner that the area-representing image of a page determined to have the trouble is shifted to a position resolving the overlapping within the page.

7. The user interface device according to claim 6, wherein the preview generating unit generates the information for the preview in such a manner that the area-representing image of a page determined to have the trouble is uniformly shifted in units of page in at least any one of left, right, top, and bottom direction to a position resolving the overlapping within the page.

8. The user interface device according to claim 6, wherein the preview generating unit generates the information for the preview in such a manner that the area-representing image of a page determined to have the trouble is independently shifted in units of page in at least any one of left, right, top, and bottom direction to a position resolving the overlapping within the page.

9. The user interface device according to claim 1, wherein the preview generating unit generates the information for the preview in such a manner that a display position of the area-representing image of each page is aligned with at least one of a left edge, a right edge, an upper edge, and a lower edge of the page as a reference.

10. The user interface device according to claim 9, wherein the operation display unit displays a function of a reference specifying process for specifying at least one of the left edge, the right edge, the upper edge, and the lower edge of the page as the reference and accepts an instruction from a display of the function, and
the preview generating unit generates the information for the preview by shifting the area-representing image of each page so that a display position of the area-representing image of each page aligned with the reference specified by the instruction.

11. The user interface device according to claim 1, wherein the preview generating unit generates a preview image that is overlapped with a plurality of area-representing images corresponding to said at least two pages.

12. The user interface device according to claim 1, wherein in a case that the meaningful information in a page of the input information is a photo, the area-representing image includes a symbolic representation of the photo identifiable visually as photo, and in a case that the meaningful information in the page of the input information is an illustration, the area-representing image includes a symbolic representation of the illustration identifiable visually as illustration, 13. The user interface device according to claim 1, wherein the meaningful information in at least one page of the at least two pages of the input information is a photo on the area of the page, and the area -representing image includes a symbolic representation of the photo identifiable visually as photo, and wherein the meaningful information in at least one page of the at least two pages of the input information is text, and the area-representing image includes a symbolic representation of the text identifiable visually as text.

14. The user interface device according to claim 1, wherein in a case that any specific page of the at least two pages of the input information includes plural areas of respective different images types, the area-representing image in the preview displayed for the specific page shows the plural areas of the respective different images types at respective positions, to enable distinguishing the respective positions of the plural areas of the respective different images types.

15. The user interface device according to claim 1, wherein the area-representing image is overlapped into the preview image for each one page of at least three pages.

16. A method of displaying an image for a user interface device that displays input information including page-by-page information and accepts a setting of a function, the method comprising:
   (a) analyzing components of the input information;
   (b) generating information on an area-representing image that represents defining of an area occupied by meaningful information in each page of the input information, based on a result of analysis;
   (c) generating information on a preview into which the area-representing image is overlapped for each one page of at least two pages, based on the information generated in (b) on the area-representing image,
   the area-representing image is one selected from a group consisting of a borderline of the area and a symbolic representation of the meaningful information, the symbolic representation being configured only to make it possible to distinguish positions of areas, each of which is occupied by a corresponding one of different image types of images represented by the meaningful information, or only to make it possible to distinguish an image type of an image represented by the meaningful information; and
   displaying including
      displaying generated information on the preview;
      displaying information on a function to be performed on the input information; and
      accepting an instruction for setting the function from a display of the information on the function, and
   when the instruction is accepted, the generating information on the preview includes generating information on a preview after performing a processing according to the instruction, and
   wherein the area-representing image selected from the group consisting of the borderline of the area and the symbolic representation of the meaningful information for one page of said at least two pages is directly overlapped in the preview, without any offset, with another area-representing image of another page of said at least two pages, in a case that the area-representing image and said another area-representing image have same positions on the respective pages of said at least two pages.

17. The method according to claim 16, wherein
the input information includes at least one type of image,
the analyzing includes analyzing an image type of the image included in the input information, and
the generating information on the area-representing image includes generating the information on the area-representing image in such a manner that the area is defined for each analyzed image type based on characters, pictures, charts, halftone images, and other image types.

18. The method according to claim 16, wherein
the generating information on the area-representing image includes generating the information on the area-representing image in such a manner that a borderline of at least one of an entire area and a defined area is displayed.

19. The method according to claim 16, wherein
the generating information on the area-representing image includes generating the information on the area-representing image in such a manner that at least one of an entire area and a defined area is displayed with a transparent color and an emphasized borderline.

20. A computer program product comprising a non-transitory computer usable storage medium having computer readable program codes embodied in the storage medium that when executed cause a computer to execute:
   (a) analyzing components of the input information;
   (b) generating information on an area-representing image that represents defining of an area occupied by meaningful information n each page of the input information, based on a result of analysis;
   (c) generating information on a preview into which the area-representing image is overlapped for each one page of at least two pages, based on the information generated in (b) on the area-representing image,
   the area-representing image is one selected from a group consisting of a borderline of the area and a symbolic representation of the meaningful information, the symbolic representation being configured only to make it possible to distinguish positions of areas, each of which is occupied by a corresponding one of different image types of images represented by the meaningful information, or only to make it possible to distinguish an image type of an image represented by the meaningful information; and
   displaying including
      displaying generated information on the preview:
      displaying information on a function to be performed on the input information: and
      accepting an instruction for setting the function from a display of the information an the function, and
   when the instruction is accepted, the generating information on the preview includes generating information on a preview after performing a processing according to the instruction, and
   wherein the area-representing image selected from the croup consisting of the borderline of the area and the symbolic representation of the meaningful information for one a e of said at least two pages is directly overlapped in the preview without any offset, with another area-representing image of another page of said at least two pages in a case that the area-representing image and said another area-representing image have same positions on the respective pages of said at least two pages.

* * * * *